(12) United States Patent
Abhari et al.

(10) Patent No.: US 11,639,473 B2
(45) Date of Patent: May 2, 2023

(54) RENEWABLE DIESEL

(71) Applicant: REG SYNTHETIC FUELS, LLC, Ames, IA (US)

(72) Inventors: Ramin Abhari, Bixby, OK (US); Nathan McMullen, Bixby, OK (US); David A. Slade, Ames, IA (US); Nate Green, Ames, IA (US)

(73) Assignee: REG Synthetic Fuels, LLC, Ames, IA (US)

( * ) Notice: Subject to any disclaimer, the term of this patent is extended or adjusted under 35 U.S.C. 154(b) by 0 days.

(21) Appl. No.: 17/282,078

(22) PCT Filed: Oct. 2, 2019

(86) PCT No.: PCT/US2019/054329
§ 371 (c)(1),
(2) Date: Apr. 1, 2021

(87) PCT Pub. No.: WO2020/072669
PCT Pub. Date: Apr. 9, 2020

(65) Prior Publication Data
US 2021/0371755 A1 Dec. 2, 2021

Related U.S. Application Data

(60) Provisional application No. 62/742,065, filed on Oct. 5, 2018.

(51) Int. Cl.
*C10G 3/00* (2006.01)
*C10G 45/62* (2006.01)

(52) U.S. Cl.
CPC ............ *C10G 3/50* (2013.01); *C10G 3/46* (2013.01); *C10G 45/62* (2013.01); *C10G 2300/1014* (2013.01); *C10G 2300/1018* (2013.01); *C10G 2300/301* (2013.01); *C10G 2300/304* (2013.01); *C10G 2300/4006* (2013.01); *C10G 2300/4012* (2013.01); *C10G 2300/802* (2013.01); *C10G 2400/04* (2013.01); *C10G 2400/08* (2013.01)

(58) Field of Classification Search
CPC ... C10G 3/50; C10G 2400/04; C10G 2400/08
See application file for complete search history.

(56) References Cited

U.S. PATENT DOCUMENTS

| | | | | |
|---|---|---|---|---|
| 8,193,402 B2* | 6/2012 | Gruber | ...................... | C10L 1/06 208/15 |
| 8,314,274 B2* | 11/2012 | Marker | ...................... | C10L 1/06 44/605 |
| 2008/0163543 A1* | 7/2008 | Abhari | ................... | C10G 45/64 44/308 |
| 2008/0244962 A1 | 10/2008 | Abhari et al. | | |
| 2011/0166396 A1 | 7/2011 | Egeberg et al. | | |
| 2011/0239532 A1* | 10/2011 | Baldiraghi | ............. | C10G 67/02 44/388 |
| 2012/0131847 A1* | 5/2012 | Pollock | ................... | C11B 13/00 44/385 |
| 2015/0112106 A1* | 4/2015 | Rockwell | .................. | C10L 1/08 585/14 |

FOREIGN PATENT DOCUMENTS

EP 2 141 217 A1 1/2010

OTHER PUBLICATIONS

International Search Report and Written Opinion in International Patent Application No. PCT/US2019/054329 dated Dec. 30, 2019.
Extended European Search Report on EP 19868640.4 dated Jun. 20, 2022 (7 pages).

* cited by examiner

*Primary Examiner* — Randy Boyer
(74) *Attorney, Agent, or Firm* — Foley & Lardner LLP

(57) ABSTRACT

The present technology relates to hydrocarbon fuels comprising renewable content. More particularly, the technology relates to manufacture of renewable diesel for potential use as aviation turbine fuel blendstock.

10 Claims, 1 Drawing Sheet

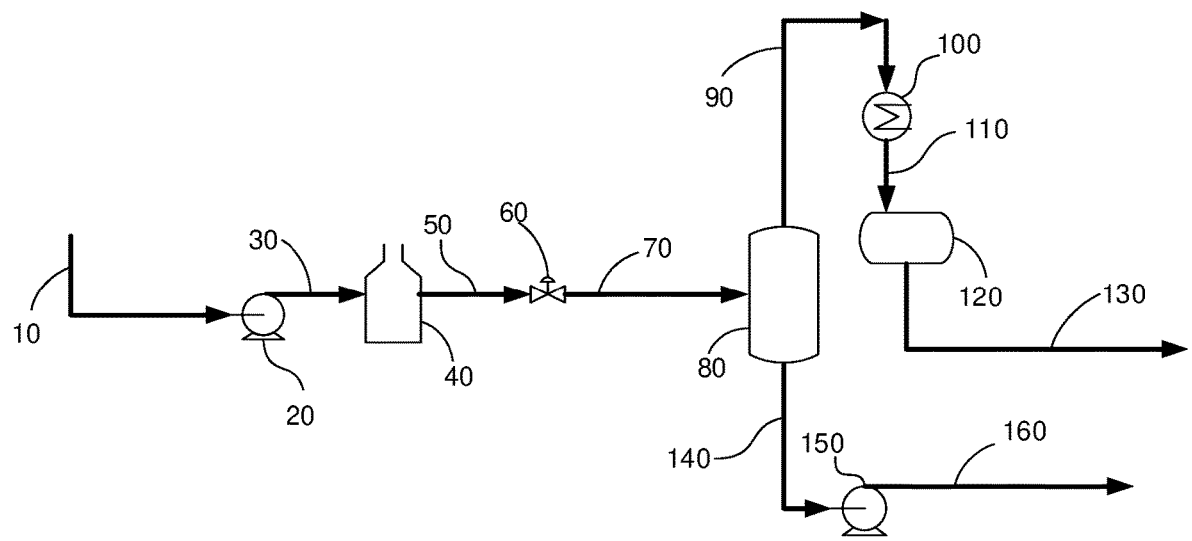

RENEWABLE DIESEL

CROSS-REFERENCE TO RELATED APPLICATIONS

The present application is a U.S. National Phase Application under 35 U.S.C. § 371 of International Application No. PCT/US2019/054329, filed Oct. 2, 2019, which claims the benefit of priority to U.S. Patent Application No. 62/742,065, filed on Oct. 5, 2018, the contents of each of which are incorporated herein by reference in their entirety.

FIELD

The present technology relates to hydrocarbon fuels comprising renewable content. More particularly, the technology relates to manufacture of renewable diesel for potential use as aviation turbine fuel blendstock.

SUMMARY

This invention describes a method for producing a renewable hydrocarbon diesel for use as a jet fuel blendstock and aviation turbine fuels containing the diesel fuel. The method comprises the step of hydrotreating and hydroisomerizing naturally occurring fatty acids in the $C_{14}$-$C_{18}$ range to hydrocarbons that are mainly in the same carbon number range. The method further may include a separator for separating the hydrocarbons such that an overhead renewable diesel fraction comprising $C_{14}$-$C_{18}$ n-paraffins and iso-paraffins is obtained. The overhead renewable diesel fraction has an existent gum value of 7 mg/100 mL or less, and a distillation boiling range such that the difference between the final boiling point and the 95% boil-off temperature (according to ASTM D2887 test method) is 20° C. or less.

BRIEF DESCRIPTION OF THE DRAWINGS

FIG. 1 provides an illustrative schematic of an embodiment of a process according to the present technology.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would be understood to mean "9 wt. % to 11 wt. %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "alkyl" groups include straight chain and branched alkyl groups. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. It will be understood that the phrase "$C_x$-$C_y$ alkyl," such as $C_1$-$C_4$ alkyl, means an alkyl group with a carbon number falling in the range from x to y.

The term "aromatics" as used herein is synonymous with "aromates" and means both cyclic aromatic hydrocarbons that do not contain heteroatoms as well as heterocyclic aromatic compounds. The term includes monocyclic, bicyclic and polycyclic ring systems (collectively, such bicyclic and polycyclic ring systems are referred to herein as "polycyclic aromatics" or "polycyclic aromates"). The term also includes aromatic species with alkyl groups and cycloalkyl groups. Thus, aromatics include, but are not limited to, benzene, azulene, heptalene, phenylbenzene, indacene, fluorene, phenanthrene, triphenylene, pyrene, naphthacene, chrysene, anthracene, indene, indane, pentalene, and naphthalene, as well as alkyl and cycloalkyl substituted variants of these compounds. In some embodiments, aromatic species contains 6-14 carbons, and in others from 6 to 12 or even 6-10 carbon atoms in the ring portions of the groups. The phrase includes groups containing fused rings, such as fused aromatic-aliphatic ring systems (e.g., indane, tetrahydronaphthene, and the like).

"Oxygenates" as used herein means carbon-containing compounds containing at least one covalent bond to oxygen. Examples of functional groups encompassed by the term include, but are not limited to, carboxylic acids, carboxylates, acid anhydrides, aldehydes, esters, ethers, ketones, and alcohols, as well as heteroatom esters and anhydrides such as phosphate esters and phosphate anhydrides. Oxygenates may also be oxygen containing variants of aromatics, cycloparaffins, and paraffins as described herein.

The term "paraffins" as used herein means non-cyclic, branched or unbranched alkanes. An unbranched paraffin is an n-paraffin; a branched paraffin is an iso-paraffin. "Cycloparaffins" are cyclic, branched or unbranched alkanes.

The term "paraffinic" as used herein means both paraffins and cycloparaffins as defined above as well as predominantly hydrocarbon chains possessing regions that are alkane, either branched or unbranched, with mono- or di-unsaturation (i.e., one or two double bonds).

Hydroprocessing as used herein describes the various types of catalytic reactions that occur in the presence of hydrogen without limitation. Examples of the most common hydroprocessing reactions include, but are not limited to, hydrogenation, hydrodesulfurization (HDS), hydrodenitrogenation (HDN), hydrotreating (HT), hydrocracking (HC), aromatic saturation or hydrodearomatization (HDA), hydrodeoxygenation (HDO), decarboxylation (DCO), hydroisomerization (HI), hydrodewaxing (HDW), hydrodemetallization (HDM), decarbonylation, methanation, and reforming. Depending upon the type of catalyst, reactor configuration, reactor conditions, and feedstock composition, multiple reactions can take place that range from purely thermal (i.e., do not require catalyst) to catalytic. In the case of describing the main function of a particular hydroprocessing unit, for example an HDO reaction system, it is understood that the HDO reaction is merely one of the predominant reactions that are taking place and that other reactions may also take place.

Decarboxylation (DCO) is understood to mean hydroprocessing of an organic molecule such that a carboxyl group is removed from the organic molecule to produce $CO_2$, as well as decarbonylation which results in the formation of CO.

Pyrolysis is understood to mean thermochemical decomposition of carbonaceous material with little to no diatomic oxygen or diatomic hydrogen present during the thermochemical reaction. The optional use of a catalyst in pyrolysis is typically referred to as catalytic cracking, which is encompassed by the term as pyrolysis, and is not be confused with hydrocracking.

Hydrotreating (HT) involves the removal of elements from groups 3, 5, 6, and/or 7 of the Periodic Table from organic compounds. Hydrotreating may also include hydrodemetallization (HDM) reactions. Hydrotreating thus involves removal of heteroatoms such as oxygen, nitrogen, sulfur, and combinations of any two more thereof through hydroprocessing. For example, hydrodeoxygenation (HDO) is understood to mean removal of oxygen by a catalytic hydroprocessing reaction to produce water as a by-product; similarly, hydrodesulfurization (HDS) and hydrodenitrogenation (HDN) describe the respective removal of the indicated elements through hydroprocessing.

Hydrogenation involves the addition of hydrogen to an organic molecule without breaking the molecule into subunits. Addition of hydrogen to a carbon-carbon or carbon-oxygen double bond to produce single bonds are two non-limiting examples of hydrogenation. Partial hydrogenation and selective hydrogenation are terms used to refer to hydrogenation reactions that result in partial saturation of an unsaturated feedstock. For example, vegetable oils with a high percentage of polyunsaturated fatty acids (e.g., linoleic acid) may undergo partial hydrogenation to provide a hydroprocessed product wherein the polyunsaturated fatty acids are converted to mono-unsaturated fatty acids (e.g., oleic acid) without increasing the percentage of undesired saturated fatty acids (e.g., stearic acid). While hydrogenation is distinct from hydrotreatment, hydroisomerization, and hydrocracking, hydrogenation may occur amidst these other reactions.

Hydrocracking (HC) is understood to mean the breaking of a molecule's carbon-carbon bond to form at least two molecules in the presence of hydrogen. Such reactions typically undergo subsequent hydrogenation of the resulting double bond.

Hydroisomerization (HI) is defined as the skeletal rearrangement of carbon-carbon bonds in the presence of hydrogen to form an isomer. Hydrocracking is a competing reaction for most HI catalytic reactions and it is understood that the HC reaction pathway, as a minor reaction, is included in the use of the term HI. Hydrodewaxing (HDW) is a specific form of hydrocracking and hydroisomerization designed to improve the low temperature characteristics of a hydrocarbon fluid.

It will be understood that if a composition is stated to include "$C_x$-$C_y$ hydrocarbons," such as $C_7$-$C_{12}$ n-paraffins, this means the composition includes one or more paraffins with a carbon number falling in the range from x to y.

A "diesel fuel" in general refers to a fuel with boiling point that falls in the range from about 150° C. to about 360° C. (the "diesel boiling range").

A "biodiesel" as used herein refers to fatty acid $C_1$-$C_4$ alkyl esters produced by esterification and/or transesterification reactions between a $C_1$-$C_4$ alkyl alcohol and free fatty acids and/or fatty acid glycerides, such as described in U.S. Pat. Publ. No. 2016/0145536, incorporated herein by reference.

A "petroleum diesel" as used herein refers to diesel fuel produced from crude oil, such as in a crude oil refining facility and includes hydrotreated straight-run diesel, hydrotreated fluidized catalytic cracker light cycle oil, hydrotreated coker light gasoil, hydrocracked FCC heavy cycle oil, and combinations thereof.

It is to be understood that a "volume percent" or "vol. %" of a component in a composition or a volume ratio of different components in a composition is determined at 60° F. based on the initial volume of each individual component, not the final volume of combined components.

Methods for production of jet fuel from renewable sources have been disclosed in the prior art. These methods comprise hydrodeoxygenation (HDO) and hydrocracking/isomerization of naturally occurring fatty acids that are typically in the $C_{14}$-$C_{18}$ range. The renewable jet product comprises iso- and n-paraffins in the $C_9$-$C_{14}$ range. This product has also been referred to as bio-SPK (synthetic paraffinic kerosene) and HEFA (hydroprocessed fatty acids and esters) in the prior art. Other than a lower density and absence of aromatics, HEFA generally conforms ASTM D1655 jet fuel specification and is approved for blends of up to 50% in commercial aviation turbine fuels according to ASTM D7566 specification.

The most common sources of the naturally occurring fatty acids for bio-SPK/HEFA production are animal fats and plant/vegetable oils wherein the fatty acids are in the form of esters/glycerides (e.g. triglycerides) or exist as free fatty acids. In the HDO reaction, the fatty acids undergo saturation and deoxygenation, yielding n-paraffins generally in the same carbon number range as the fatty acids. The mainly $C_{14}$-$C_{18}$ n-paraffin thus produced is then subjected to a hydrocracking/isomerization reaction to yield a $C_3$-$C_{18}$ hydrocarbon distribution comprising n-paraffins and iso-paraffins. The hydrocarbon distribution is subsequently processed through a plurality of distillation columns whereby the distribution of n- and iso-paraffins is fractionated into LPG ($C_3$/$C_4$), naphtha ($C_5$-$C_8$), jet fuel ($C_9$-$C_{14}$) and diesel ($C_{15}$-$C_{18+}$). Due to the inherent non-selective nature of the hydrocracking reactions, production of jet fuel according to the method of prior art invariably results in co-production of lower value LPG and naphtha hydrocarbons. Furthermore, the energy-intensive fractionation adds to the capital and operating costs.

Production of renewable diesel (RD) via fatty acid HDO to n-paraffins followed by n-paraffin hydroisomerization (HI) provides better economics since only isomerization of the n-paraffins is necessary and the HI catalyst and operating conditions may be selected to minimize formation of low-value co-products from hydrocracking side reactions. Although jet fuel specifications limit the final boiling point (FBP) of jet fuel to 300° C. (based on ASTM D86 standard test method), this has been set mainly to limit carbon-forming poly-aromatic hydrocarbons from the jet engine. These components have been tied to increased flame radiation, lower hot parts life, and higher engine soot/smoke formation. The virtual absence of aromatics has allowed investigation of renewable diesel as a jet blendstock despite the fact that diesel has a higher FBP than that specified for jet fuel. More recent prior art has thus looked at using RD as a jet fuel blendstock as long as the final blend conforms to the D1655 specification. The blend amount is generally dictated by the freezing point (which needs to be at or below the specification limit of −40° C. max for Jet A commercial aviation fuel). For RD fuels with cloud point in the −10 C to −30° C. range, jet fuel blends containing about 1 vol. % to about 30 vol. % of the RD may be considered.

The life cycle greenhouse gas emissions for RD has been estimated to be between 50 and 70% lower than petroleum-refined diesel and jet fuel. As such even at 5-20 vol. % addition rates, RD provides a cost-effective option for the aviation industry to lower its carbon emissions.

However, the existent gum value—a measure of storage stability and heavy contaminants content of the fuel—is generally too high for RD and raises concerns about potential presence of polymeric contaminants in the fuel. Even if these can be diluted down to specification limit, concerns about the impact of polymeric contaminants (dissolved in RD) depositing on jet engine's fuel nozzle and associated components remain.

Consequently, there remains a need for a renewable diesel product that meets the existent gum specification of jet fuel and eliminates the risk of polymeric contaminants in the fuel.

The present invention relates to a method of producing a renewable diesel product that has an existent gum value of 7 mg/100 mL or less, and is substantially free of heavy/polymeric contaminants as indicated by final boiling point (FBP) minus 95% boil-off temperature (T95) of 20° C. or less. The existent gum and boiling range are measured by ASTM test methods D381 and D2887 respectively.

Referring to FIG. 1 as a non-limiting example, a hydroisomerizate 10 comprising $C_{14}$-$C_{18}$ n- and iso-paraffins is subjected to further processing. The hydroisomerizate is produced by subjecting a source of naturally occurring $C_{14}$-$C_{18}$ fatty acids (as glycerides or free fatty acids) to hydrodeoxygenation (HDO) and hydroisomerization (HI) according to the methods such as those described in U.S. Pat. Nos. 7,232,935, 7,968,757 and 8,628,308. In embodiments, the fatty acids are free fatty acids, mono-, di-, and tri-glycerides present in lipid feedstock. In embodiments, the lipid feedstock are animal fats and vegetable oils, including tallow, lard, poultry, fish, canola, rapeseed, palm, soy, corn, jatropha, carinata, cotton seed, hempseed, sunflower, microbial oil, restaurant and food processing greases, or a combination of any two or more thereof. In embodiment, the lipid feedstock undergoes a pretreatment step for removal of contaminants prior to hydrodeoxygenation. In embodiments, the pretreated fats, oils, and greases, contain less than 6 ppm phosphorus, less than 2 ppm silicon, less than 600 ppm organic nitrogen, and less than 6 ppm total metals, wherein the metals include iron, sodium, potassium, calcium, magnesium, and copper. In embodiments, the HDO reaction is performed under at least 500 psia hydrogen partial pressure at temperatures in the 500-700° F. range over a sulfided molybdenum or tungsten catalyst promoted by nickel and/or cobalt. In embodiments, an organosulfur compound is introduced to the pretreated fats, oils, and greases to ensure the catalyst remains in the active sulfide form. In embodiments, the feedstock is diluted with a hydrocarbon solvent. Preferred hydrocarbon diluent/solvents for the feedstock include petroleum middle distillates, or slip streams/fractions from the hydrodeoxygenation or hydroisomerization reactor products described later herein.

In embodiments, the HDO effluent comprising $C_{14}$-$C_{18}$ n-paraffins is stripped of reaction byproducts such as water, propane, CO, $CO_2$, $H_2S$, and $NH_3$ before being subjected to HI reaction to partially isomerize the $C_{14}$-$C_{18}$ n-paraffins to $C_{14}$-$C_{18}$ isoparaffins. In embodiments, the HI reaction is performed under at least 500 psia hydrogen partial pressure at temperatures in the 580-680° F. range over a bifunctional catalyst providing both hydrogenation-dehydrogenation and acid functionalities. In embodiments, the hydrogenation-dehydrogenation functionality is provided by noble metals such as platinum (or platinum with palladium) or base metals such as tungsten (or tungsten with nickel). In embodiments, the acid functionality is from silica-alumina and silica-alumina-phosphate supports including zeolites.

The hydroisomerizate may further comprise $C_9$-$C_{13}$ and $C_5$-$C_8$ hydrocarbons such as those produced during hydrocracking side reactions. The hydroisomerizate 10 may have a cloud point of about 0° C. or lower, typically between about −5° C. and −20° C., a flash point of about 52° C. or higher. The hydroisomerizate 10 may conform to ASTM D925, and be used as a diesel fuel neat or blended with petroleum diesel or fatty acid methyl esters (biodiesel). However, hydroisomerizate 10 has an existent gum value (according to ASTM D381) that is above 7 mg/100 mL and considered unsuitable for use as a jet fuel blendstock even at low blend concentrations (due to polymer/heavy contaminant concerns). Furthermore, the hydroisomerizate has a value of final boiling point minus 95% boil-off temperature (FBP-T95) that is greater than 30° C. as measured by D2887 test method.

Referring again to FIG. 1, hydroisomerizate 10 is pressurized with pump 20 to 100-300 psig to provide a pressurized hydroisomerizate 30, which is subsequently heated in a heater 40. The heater 40 may be a fired heater or a shell and tube heater with high-pressure steam or hot oil flowing through the shell side while the pressurized hydroisomerizate 30 flows through the tubes. Various process heater apparatus/system configurations are known to those skilled in the art and may be adapted to the present method. In either case, the heater 40 provides a net duty between 500 and 1000 Btu per pound of the hydroisomerizate (10, 30). A heated stream 50 is maintained as liquid by a pressure letdown valve 60. The letdown valve provides a pressure reduction between about 80 and about 280 psi to generate a two-phase stream 70 consisting of liquid and vapor phases.

The liquid and vapor are subsequently separated in a hydroisomerizate splitter 80. The splitter 80 is preferably a flash drum. The vapor phase 90 is condensed through a condenser 100 as a condensed stream 110 comprising liquids suitable for use as a jet fuel blendstock. In embodiments, the condensed stream 110 accumulates in drum 120 to provide a renewable diesel product 130—a diesel well-suited for blending with jet fuel at concentrations between about 1 vol. % to about 30 vol. % (such as, e.g., about 5 vol. % to about 20 vol. %). The condenser 100 may be air- or water-cooled, as various condenser apparatus/system configurations are known to those skilled in the art and may be adapted to the present method.

The renewable diesel product has a closed-cup flash point value of 38° C. minimum, preferably 52° C. minimum, and most preferably 60° C. minimum. In embodiments where the hydroisomerizate 10 comprises $C_5$-$C_8$ hydrocarbons, the renewable diesel may undergo a flash point correction step (e.g. by stripping the light hydrocarbons).

The renewable diesel product 130 has an existent gum value of 7 mg/100 mL or less, as measured by D381 test method. In embodiments, the condensed stream 110 has a final boiling point minus 95% boil-off temperature (FBP-T95) value of 20° C. or less, as measured by D2887 test method. The reduction in FBP-T95 value for the renewable diesel product compared to hydroisomerizate was a surprising aspect of the present technology allowing for conformance to jet fuel existent gum specification and addressing the polymers/heavy contaminant concern without costly, energy-intensive, and carbon-intensive separation methods such as distillation columns/towers. Distillation columns/towers comprise packing/trays and other internals, reflux condensers/drums/pumps, reboilers, to provide counter-current contacting. As known to those skilled in the art, the liquid vapors cooled for reflux need to be partially boiled up, resulting in relatively high energy consumption.

At least 90% of the renewable diesel hydrocarbons are n-paraffins and iso-paraffins in the $C_{14}$-$C_{18}$ range. The ratio of $C_{14}$-$C_{18}$ iso-paraffins to $C_{14}$-$C_{18}$ n-paraffins is between 4:1 and 30:1. The cloud point of the renewable diesel fuel is less than −5° C., preferably between −30° C. and −8° C., and most preferably between −30° C. and −12° C.

In other embodiments, instead of an adiabatic flash system as shown in FIG. 1 (a heater 40 followed by let down valve 60 to an unheated flash drum 80), an isothermal evaporator system may be used as hydroisomerizate splitter. In these embodiments, the evaporation duty (between about 500 and 1000 Btu per pound of the hydroisomerizate) is provided by direct heating in an evaporator. Such evaporators include wiped film and falling film evaporators. Regardless of type of evaporator or flash system, no counter-current rectification is provided (as is the case with a distillation column). The temperature of the evaporator or flash drum is dictated by operating pressure that may range from slight vacuum (down to 100 mm Hg) to 50 psig. When the hydroisomerizate splitter operates under vacuum, the pressure-drop across the letdown valve 60 provides a pressure drop greater than the upstream (stream 50) gauge pressure.

Referring back to FIG. 1, the bottoms diesel product 140/160 has an increased final boiling point but conforms to ASTM D975-09 Table 1 specifications for on-road diesel. This stream is transferred via pump 150 for storage and supply as on-road renewable diesel while renewable diesel product 130 is directed to aviation application. The split between the overhead renewable diesel product 130 and the bottoms product 160 depends on relative demand for the two fuels and can range between 10:90 and 90:10.

The present technology, thus generally described, will be understood more readily by reference to the following examples, which are provided by way of illustration and are not intended to be limiting of the present technology.

EXAMPLES

Example 1

Renewable diesel was produced from a blend of commercial fats, oils, and greases (FOG), comprising beef tallow, inedible corn oil, and used cooking oil, according to previously described methods (e.g., U.S. Pat. Nos. 7,968,757, 8,629,308, and 9,404,064). Specifically, the FOG was pretreated according to a method comprising the steps described in U.S. Pat. No. 9,404,064, and subsequently subjected to hydrodeoxygenation and hydroisomerization according to U.S. Pat. Nos. 7,968,757 and 8,629,308, and further described herein.

During accumulation of the renewable diesel in a storage tank for jet fuel blending experiments, samples were taken for cloud point, GC, and boiling range analysis. A typical sample had cloud point of −12° C. The GC analysis confirmed that 91.5% of the renewable diesel hydrocarbons were in the $C_{14}$-$C_{18}$ range.

A GC SimDist analysis (D2887) gave final boiling point (FBP) value of 458.4° C. and T95 value of 312.9° C. That is, the FBP-T95 difference was 145.5° C. (454.4° C. −312.9° C.=145.5° C.). The D381 existent gum test was performed on the diesel accumulated in the storage tank and was found to be 451 mg/100 mL (compared to jet fuel specification value of 7 mg/100 mL maximum).

This was compared to a jet fuel produced by distillation of renewable diesel. Here the $C_{16+}$ fraction had been separated as the bottoms fraction, providing a distillate with a $C_9$-$C_{15}$ carbon number range, a D2887 final boiling point value of 278.5° C., and a T90 value of 265.5° C. (indicating a FBP-T95 difference of less than 13° C.). The existent gum value was found to be less than 1 mg/100 mL. A review of other middle distillate fuels showed a general correlation between existent gum and D2887 FBP-T95 value and the need for this value to be below 20° C.

Example 2

An embodiment of the invention was modeled using the HYSYS steady-state process simulation software. The Peng Robinson equation of state was selected for the simulation, with components from corresponding data library. Peng Robinson is the recommended method for modeling middle distillate range hydrocarbon vapor-liquid equilibrium separations. The GC analysis data of a hydroisomerizate was used for the model's hydroisomerizate feed composition of n-paraffins and isoparaffins. This was a hydrocarbon composition in the $C_5$-$C_{24+}$ range, with 94.3 wt. % in the $C_{14}$-$C_{18}$ range. The single-stage adiabatic flash separation shown in FIG. 1 was thus simulated. Cases for recovery of 10% to 90% of the feed as overhead product were simulated and found to provide compositions of mainly $C_{14}$-$C_{18}$ hydrocarbons.

Example 3

The simulation of Example 2 was re-run using hypothetical components created through the HYSYS Oil Manager Environment by inputting the SimDist (D2887 analysis) boiling range instead of composition. Three cases were run using the feed SimDist data to generate heat and material balances corresponding to 70%, 80%, and 90% of the mass flow rate of feed recovered as overhead product. The corresponding boiling ranges for each case is presented in Table 1 below.

TABLE 1

Boiling Ranges (wt % vs deg C.) for RD Feed and Products

| | | Fraction Overhead | | |
|---|---|---|---|---|
| | Feed | 70% | 80% | 90% |
| IBP | 268.1 | 256.9 | 261.2 | 264.9 |
| T5 | 277.7 | 268.0 | 271.6 | 274.7 |
| T10 | 284.0 | 275.6 | 278.6 | 281.2 |

TABLE 1-continued

Boiling Ranges (wt % vs deg C.) for RD Feed and Products

| | Feed | Fraction Overhead | | |
| --- | --- | --- | --- | --- |
| | | 70% | 80% | 90% |
| T20 | 290.7 | 283.7 | 286.1 | 288.2 |
| T30 | 294.6 | 288.3 | 290.3 | 292.1 |
| T40 | 297.3 | 291.4 | 293.1 | 294.7 |
| T50 | 299.5 | 293.6 | 295.2 | 296.7 |
| T60 | 301.6 | 295.4 | 296.9 | 298.3 |
| T70 | 303.7 | 296.9 | 298.3 | 299.7 |
| T80 | 306.7 | 298.2 | 299.6 | 301.1 |
| T90 | 313.5 | 299.5 | 301.0 | 302.9 |
| T95 | 325.5 | 300.4 | 302.0 | 304.4 |
| FBP | 384.0 | 320.1 | 319.7 | 319.7 |
| FBP-T95 | 58.5 | 19.7 | 17.8 | 15.4 |

As observed from Table 1, all products had a FBP-T95 difference of 20° C. or less, despite retaining the renewable diesel boiling range (as shown in Example 2).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such A. A process for producing a renewable diesel overhead fraction comprising the steps of
   a. subjecting a feedstock comprising free fatty acids, mono-, di-, and/or tri-glycerides to hydrodeoxygenation (HDO) to produce an HDO effluent comprising $C_{14}$-$C_{18}$ n-paraffins;
   b. subjecting the HDO effluent to hydroisomerization to produce a hydroisomerizate comprising $C_{14}$-$C_{18}$ isoparaffins and unreacted $C_{14}$-$C_{18}$ n-paraffins; and
   c. separating the hydroisomerizate into an overhead renewable diesel fraction and a bottoms fraction wherein both fractions comprise $C_{14}$-$C_{18}$ n-paraffins and $C_{14}$-$C_{18}$ isoparaffins;
   wherein the overhead renewable diesel has a difference of 20° C. or less between its final boiling point (FBP) and its 95% boil-off temperature (T95) according to ASTM D2887 simulated distillation test method.

B. The process of Paragraph A, wherein the overhead renewable diesel fraction 1 has an existent gum value of 7 mg/100 mL or less according to ASTM D381.

C. The process of Paragraph A or Paragraph B, wherein the overhead renewable diesel fraction comprises at least 90% $C_{14}$-$C_{18}$ n-paraffins.

D. The process of any one of Paragraphs A-C, wherein the overhead renewable diesel fraction is used as jet fuel blendstock.

E. The process of any one of Paragraphs A-D, wherein the separating of the hydroisomerizate is conducted in a flash drum.

F. The process of any one of Paragraphs A-E, wherein the separating of the hydroisomerizate is conducted in a wiped film evaporator.

G. The process of any one of Paragraphs A-F, wherein the separating does not include reflux of the overhead renewable diesel fraction.

H. The process of any one of Paragraphs A-G, wherein the feedstock comprises tallow, lard, poultry fat, fish oil, canola oil, rapeseed oil, palm oil, soybean oil, corn oil, jatropha oil, carinata oil, cotton seed oil, hempseed oil, sunflower oil, greases from restaurants and/or food processing operations, microbial oil, or a combination of any two or more thereof.

I. The process of any one of Paragraphs A-H, wherein the cloud point of the overhead renewable diesel fraction is less than −5° C.

J. The process of any one of Paragraphs A-I, wherein the cloud point of the overhead renewable diesel fraction is between −12° C. and −30° C.

K. The process of any one of Paragraphs A-J, wherein the hydrodeoxygenation is performed under at least 500 psia hydrogen partial pressure at temperatures in the 500-700° F. range over a sulfided molybdenum catalyst promoted by nickel and/or cobalt.

L. The process of any one of Paragraphs A-K, wherein the hydroisomerization is performed under at least 500 psia hydrogen partial pressure at temperatures in the 580-680° F. range over a bifunctional catalyst comprising platinum or tungsten and a support comprising silica.

M. The process of any one of Paragraphs A-L, wherein the feedstock is diluted with a hydrocarbon solvent.

N. The process of Paragraph M, wherein the hydrocarbon solvent is a petroleum middle distillate.

O. A jet fuel comprising between about 1 vol. % and about 30 vol. % of anoverhead renewable diesel fraction provided according the process of any one of Paragraphs A-N.

Other embodiments are set forth in the following claims.

What is claimed is:

1. A process for producing a renewable diesel overhead fraction comprising the steps of
   a. subjecting a feedstock comprising free fatty acids, mono-, di-, and/or tri-glycerides to hydrodeoxygenation (HDO) to produce an HDO effluent comprising $C_{14}$-$C_{18}$ n-paraffins;
   b. subjecting the HDO effluent to hydroisomerization to produce a hydroisomerizate comprising $C_{14}$-$C_{18}$ isoparaffins and unreacted $C_{14}$-$C_{18}$ n-paraffins; and
   c. separating the hydroisomerizate in a flash drum into an overhead renewable diesel fraction and a bottoms fraction wherein both fractions comprise $C_{14}$-$C_{18}$ n-paraffins and $C_{14}$-$C_{18}$ isoparaffins;
   wherein the overhead renewable diesel has a difference of 20° C. or less between its final boiling point (FBP) and its 95% boil-off temperature (T95) according to ASTM D2887 simulated distillation test method;
   wherein the overhead renewable diesel fraction has an existent gum value of 7 mg/100 mL or less according to ASTM D381; and
   wherein the hydroisomerizate has a value of final boiling point minus 95% boil-off temperature (FBP-T95) that is greater than 30° C. as measured by ASTM D2887 simulated distillation test method.

2. The process of claim 1, wherein the overhead renewable diesel fraction comprises at least 90% $C_{14}$-$C_{18}$ n-paraffins and iso-paraffins.

3. The process of claim 1, wherein the overhead renewable diesel fraction is used as jet fuel blendstock.

4. The process of claim 1, wherein the feedstock comprises tallow, lard, poultry fat, fish oil, canola oil, rapeseed oil, palm oil, soybean oil, corn oil, jatropha oil, carinata oil, cotton seed oil, hempseed oil, sunflower oil, greases from restaurants and/or food processing operations, microbial oil, or a combination of any two or more thereof.

5. The process of claim 1, wherein the cloud point of the overhead renewable diesel fraction is less than −5° C.

6. The process of claim 5, wherein the cloud point of the overhead renewable diesel fraction is between −12° C. and −30° C.

7. The process of claim 1, wherein the hydrodeoxygenation is performed under at least 500 psia hydrogen partial pressure at temperatures in the 500-700° F. range over a sulfided molybdenum catalyst promoted by nickel and/or cobalt.

8. The process of claim 1, wherein the hydroisomerization is performed under at least 500 psia hydrogen partial pressure at temperatures in the 580-680° F. range over a bifunctional catalyst comprising platinum or tungsten and a support comprising silica.

9. The process of claim 1, wherein the feedstock is diluted with a hydrocarbon solvent.

10. The process of claim 9, wherein the hydrocarbon solvent is a petroleum middle distillate.

* * * * *